United States Patent
Brinati et al.

(10) Patent No.: US 6,207,758 B1
(45) Date of Patent: Mar. 27, 2001

(54) FLUORINATED THERMOPLASTIC ELASTOMERS

(75) Inventors: Giulio Brinati, Milan; Vincenzo Arcella, Novara, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/210,394

(22) Filed: Dec. 14, 1998

(30) Foreign Application Priority Data

Dec. 15, 1997 (IT) .............................. MI97A2764

(51) Int. Cl.$^7$ .............. C08L 53/00; C08L 27/16; C08L 27/18; C08J 3/28
(52) U.S. Cl. .............. 525/200; 525/199; 264/473; 264/496; 522/112; 522/109
(58) Field of Search ................... 522/109, 110, 522/111, 112, 117, 124; 525/199, 200; 264/473, 496

(56) References Cited

U.S. PATENT DOCUMENTS

| | | |
|---|---|---|
| 3,810,874 | 5/1974 | Mitsch et al. . |
| 3,865,845 | 2/1975 | Resnick . |
| 3,978,030 | 8/1976 | Resnick . |
| 4,051,003 * | 9/1977 | Aronoff et al. ............... 525/185 |
| 4,158,678 | 6/1979 | Tatemoto et al. . |
| 4,960,624 * | 10/1990 | Ueno ............................ 428/35.1 |
| 5,057,345 * | 10/1991 | Barrett ......................... 428/35.1 |
| 5,473,030 | 12/1995 | Arcella et al. . |
| 5,583,190 | 12/1996 | Brinati et al. . |
| 5,612,419 * | 3/1997 | Arcella et al. . |

FOREIGN PATENT DOCUMENTS

| | | |
|---|---|---|
| 0 073 087 | 3/1983 | (EP) . |
| 0 076 581 | 4/1983 | (EP) . |
| 0 080 187 | 6/1983 | (EP) . |
| 0 444 700 A2 | 9/1991 | (EP) . |
| 524 700 A1 | 1/1993 | (EP) . |
| 661 312 A1 | 7/1995 | (EP) . |
| 0 683 186 B1 | 9/1997 | (EP) . |

* cited by examiner

Primary Examiner—Susan W. Berman
(74) Attorney, Agent, or Firm—Arent, Fox, Kintner, Plotkin & Kahn

(57) ABSTRACT

Compositions containing fluorinated thermoplastic elastomers with different moelcular weight and with different plastomeric phase/elastomeric phase ratio, essentially formed by:

(a) 30–80% by weight, preferably 50–80%, of a fluorinated thermoplastic elastomer, having a block structure of A-B-A type, wherein A is a plastomeric segment and B is an elastomeric segment;

(b) 10–50% by weight, preferably 20–40% of a fluorinated thermoplastic elastomer having a block structure of A-B-A type;

(c) 0–30% by weight, preferably 0–15%, of a fluorinated plastomer preferably of the same kind as that contained in the component (a) and/or (b).

21 Claims, No Drawings

FLUORINATED THERMOPLASTIC ELASTOMERS

The present invention relates to fluorinated thermoplastic elastomers having improved processing, in particular in the fuel hoses extrusion for motor applications and in the injection molding of various manufactured articles, especially O-rings and shaft seals.

As it is known, the thermoplastic elastomers are block copolymers consisting of at least a soft segment having elastomeric properties and of at least a hard segment having plastomeric properties. Such products combine therefore the typical properties of conventional cured elastomers with those typical of plastomers.

Compared with the conventional elastomers, the thermoplastic elastomers do not require any curing process, wherefore they become easily processable and recyclable according to the techniques usually employed for the thermoplastic polymers, with both economic and ecological clear advantages.

Fluorinated thermoplastic elastomers are known in the art. For instance, in U.S. Pat. No. 4,158,678 block fluorinated polymers are described, formed by alternate hard and soft segments, at least one of which is fluorinated. Such products are obtained by radical polymerization of fluorinated monomers in the presence of an iodinated chain transfer agent of formula $RI_n$, wherein R is a fluorinated radical, optionally containing chlorine, having from 1 to 8 carbon atoms, and n is 1 or 2, thus obtaining a first fluorinated segment, with elastomeric or plastomeric features depending on the monomeric composition, having an iodine atom on one or both the end terminals. On such segment other fluorinated or non fluorinated different segments are grafted, by utilizing the fact that the terminal iodine atoms are sensitive to the radical attack and can therefore give rise to a new polymeric chain. It is thus possible to obtain, for example, fluorinated thermoplastic elastomers of A-B-A type, wherein A is a plastomeric segment (for example an homopolymer or copolymer deriving from tetrafluoroethylene and/or vinylidene fluoride), while B is an elastomeric segment (for example a tetrafluoroethylene/vinylidene fluoride/hexafluoropropene copolymer). Other thermoplastic elstomers of this kind are described in EP 444,700.

The drawbacks of such products are mainly of two types. On one hand the mechanical and elastic properties become poor when the temperature rises. Already at 50° C. such characteristics become unsatisfactory. Another disadvantage is caused by the processing difficulty due to the high viscosity of the material. In order to improve the processing, generally the molecular weight of the thermoplstic elastomer is reduced, in particular the molecular weight of the elastomeric part is reduced. In this case, however, the mechanical and elastic properties further fall off without obtaining an acceptable behaviour in processing.

Fluorinated thermoplastic elastomers having improved mechanical and elastic properties by the introduction in the polymeric chain of small amounts of a bis-olefin, are known also from U.S. Pat. No. 5,612,419. The resulting products are specifically characterized by improved mechanical properties and by particularly low compression set values compared with the fluorinated thermoplastic elastomers of the previously described patents. New fluorinated thermoplastic elastomers having mechanical and elastomeric properties similar to the U.S. Pat. No. 5,612,419 products, but having in the chain instead of the bis-olefin, small amounts of a fluorinated olefin containing a terminal iodine atom, are also known from EP 683,186. In the European Patent Application 98111124.8 it is described the curing, after the processing phase by GAMMA or BETA rays and in the presence of a suitable crosslinking agent, of the thermoplastic elastomers previously described. In particular, the curing by radiations of the bis-olefin containing polymers, object of U.S. Pat. No. 5,612,419, allows to obtain a remarkable increase of the sealing properties also at high temperatures, in the range of 150° C. However the processing of all the thermoplastic elastomers described in the preceding Patents results poor, in particular the processing of the thermoplastic elastomers, wherein the plastomeric phase is formed by polyvinylidenfluoride (PVDF), results even poorer. Since these latter show the best compression set properties at high temperature (see European Patent Application 98111124.8), it is important to set up synthesis methods allowing to prepare polymers mainly based on PVDF as plastomeric phase, able to be processed by extrusion to prepare fuel hoses with high extrusion rates and good surface aspect of the extruded product, or by injection molding to prepare O-rings and shaft seals.

For the thermoplastic elastomers of the art it is possible to improve the processing for example by reducing the molecular weight of the elastomeric phase. However the polymer elastic/mechanical properties are thus compromised.

It has now been surprisingly and unexpectedly found that it is possible to obtain thermoplastic elastomers with improved processing and contemporaneously having good mechanical and elastic properties.

It is therefore an object of the present invention a composition containing fluorinated thermoplastic elastomers having different moelcular weight and with different plastomeric phase/elastomeric phase ratio, said composition having dynamic viscosity determined by rheogoniometer RMS® 800 (Frequency sweep, frequency of $10^{-2}$ radiants/sec, parallel plates) lower than $10^7$ poise and Melt Flow Index (MFI), determined according to the ASTM D 1238-52T method with a 5 Kg load, higher than 1 (g/10 minutes); said composition being essentially formed by:

(a) 30–80% by weight, preferably 50–80%, of a fluorinated thermoplastic elastomer, having a block structure of A-B-A type, wherein A is a plastomeric segment and B is an elastomeric segment, in which at least one block is constituted by a fluorinated elastomer and at least one block by a fluorinated plastomer; said elastomeric segment B having a mooney viscosity (1+10 at 121° C.), determined according to the ASTM D 1648-82 method, higher than 10, more preferably higher than 30;

the plastomeric phase A amount being in the range 5–40% by weight, preferably 10–30%, more preferably 15–25%; the MFI of the thermoplastic elastomer determined according to the ASTM D 1238-52T method with the load of 5 Kg being lower than 0.1;

(b) 10–50% by weight, preferably 20–40% of a fluorinated thermoplastic elstomer having a block structure of A-B-A type, wherein A is a plastomeric segment and B is an elastomeric segment, wherein there is at least one fluorinated elastomeric segment and at least one fluorinated plastomeric segment;

the elastomer B having a mooney viscosity (1+10 at 121° C.), determined according to the ASTM D 1648-82 method, lower than 5, preferably lower than 1;

the plastomeric phase A must be in the range 2–20% by weight, preferably 3–10%; preferably the plastomeric phase must have similar monomeric composition, more preferaby the same plastomeric phase A of the component (a);

the MFI of the thermoplastic elastomer (b), determined according to the ASTM D 1238-52T method with the load of 5 Kg, being higher than 100;

(c) 0–30% by weight, preferably 0–15%, of a fluorinated plastomer preferably of the same kind as that contained in the component (a) and/or (b);

the MFI value, determined according to the method above indicated being higher than 1, preferably higher than 50; the sum of (a)+(b)+(c) being 100% by weight.

The composition can optionally contain from 1 to 10 phr (parts for 100 parts of (a)+(b)+(c)) of a crosslinking agent. In this case the obtained manufactured article, for example after extrusion or molding, can be irradiated by GAMMA rays, in an amount comprised between 1 and 30 Mrad, or BETA radiations in an amount comprised between 10 and 300 KGY (Kilogrey).

Said irradiation can be carried out for example according to the Patent Application No. 09/098,306, filed Jun. 18, 1998, now U.S. Pat. No. 6,107,363, herein incorporated by reference.

As preferred crosslinking agents the triallyl-isocyanurate (TAIC), 1,6 divinylperfluorohexane (bis-olefin), N,N'bisallylbicyclo-oct-7-ene-disuccinimide (BOSA), can be mentioned, which have the following structures:

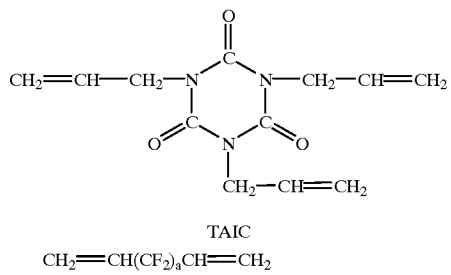

TAIC $CH_2$=$CH(CF_2)_4CH$=$CH_2$ 1,6 DIVINYLPERFLUOROHEXANE

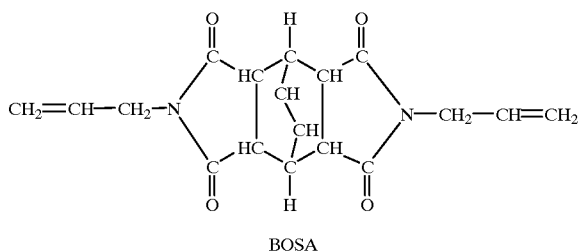

BOSA

The dynamic visosity of the invention compositions, determined by rheogoniometer RMS® 800, as said, is lower than $10^7$ poise at the frequency of $10^{-2}$ radiants/sec. If PVDF is used as plastomeric phase A both of component (a) and (b), optionally (c), the temperature at which the viscosity is measured is of about 200° C.

The Applicant has found that the compositions according to the present invention show a molecular weight bimodal distribution at the GPC analysis (gel permeation chromatography). In the graph obtained by GPC and having in abscissa the molecular weight logarithm and in ordinate the polymer weight fraction, the presence of two distinct peaks is noticed, which indicate a polymer having a molecular weight bimodal distribution.

The molecular weight determination by GPC is carried out by using the following instrumentation and operating conditions:

pump: Waters® mod.590 detector: UV Varian® mod. 2550 columns: precolumn+n° 4 columns respectively of: $10^6$ Å, $10^5$ Å, $10^4$ Å, $10^3$ Å Ultrastyragel® injector: Rheodynee® 7010 eluent: tetrahydrofurane eluent flow rate: 1 cm³/min sample concentration in the injected solution: 0.5% w/w loop injection: 200 µl temperature: 30° C.

The fluorinated thermoplastic elastomers forming the component (a) contain, preferably in the elastomeric segment B, an amount by moles, calculated on the total amount of the other elastomer or plastomer monomers from 0.01 to 1.0%, preferably from 0.03 to 0.5%, still more preferably from 0.05 to 0.2%, of units deriving from bis-olefins having general formula:

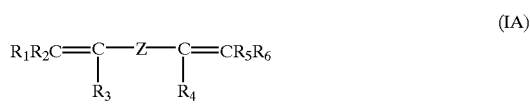

(IA)

wherein:

$R_1$, $R_2$, $R_3$, $R_4$, $R_5$, $R_6$, equal to or different from each other are H or $C_1$–$C_5$ alkyls; Z is a $C_1$–$C_{18}$, linear or branched, alkylene or cycloalkylene radical optionally containing oxygen atoms, preferably at least partially fluorinated, or a (per)fluoropolyoxyalkylene radical.

The fluorinated thermoplastic elastomers forming the component (b) can contain, preferably in the elastomeric segment B, an amount by moles calculated as above said, from 0 to 1.0%, preferably from 0 to 0.5%, still more preferably from 0 to 0.2% by moles, of units deriving from bis-olefins having the general formula (IA).

In at least one among the segments of type A or type B, preferably in the elastomeric segment B, of the two components (a) and/or (b) it can be present instead of the bis-olefin, in the same amounts above mentioned for the bis-olefin, monomeric units deriving from at least one iodinated olefin having the formula:

$CX_2$=$CX$—$R_f$—$CHR$—$I$    (I B)

wherein:

X is —H, —F, or —$CH_3$; R is —H or —$CH_3$; $R_f$ is a, linear or branched, (per)fluoroalkylene radical, optionally containing one or more ether oxygen atoms, or a (per)fluoropolyoxyalkylene radical.

In the formula (I A), Z is preferably a $C_4$–$C_{12}$ perfluoroalkylene radical, while $R_1$, $R_2$, $R_3$, $R_4$, $R_5$, $R_6$ are preferably hydrogen.

When Z is a (per)fluoropolyoxyalkylene radical, it preferably has the formula:

(II A)

wherein: Q is a $C_1$–$C_{10}$ alkylene or oxyalkylene radical; p is 0 or 1; m and n are numbers such that the m/n ratio is in the range 0.2–5 and the molecular weight of said (per)fluoropolyoxyalkylene radical is in the range 500–10,000, preferably 1,000–4,000. Preferably, Q is selected among:

The bis-olefins of formula (IA) wherein z is an alkylene or cycloalkylene radical, can be prepared according to what described, for example, by I. L. Knunyants et al in Izv. Akad. Nauk. SSSR, Ser. Khim., 1964(2), 384–6, while the bis-olefins containing the (per) fluoropolyoxyalkylene sequences of formula (II) are described in U.S. Pat. No. 3,810,874.

Iodinated olefins acording to formula (I B) can be selected in particular among the following classes:

(1) CHR=CH—Z—CH$_2$CHR—I     (II B)

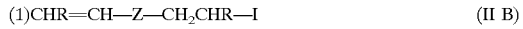

wherein: R is —H or —CH$_3$; Z is a C$_1$–C$_{18}$, linear or branched, (per)fluoroalkylene radical optionally containing one or more ether oxygen atoms, or a (per) fluoropolyoxyalkylene radical;

(2) CF$_2$=CF—O—(CF$_2$CFYO)$_n$—(CF$_2$CF$_2$CH$_2$O)$_m$— CF$_2$CF$_2$CH$_2$I     (III B)

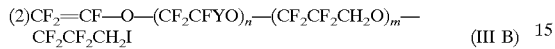

wherein: Y is —F or —CF$_3$; m is an integer in the range 0–5; n is 0, 1 or 2;

As regards the formula (II B), Z is preferably a C$_4$–C$_{12}$ perfluoroalkylene radical, or a (per)fluoopolyoxyalkylene radical as defined in the formula (II A).

The formula (I A) bisolefins and the formula (I B) olefins are described, respectively, in U.S. Pat. No. 5,612,419 and EP 683,186 herein incorporated by reference.

The fluorinated elastomer and the fluorinated plastomer are obtainable by (co)polymerization of fluorinated olefinic monomers. By fluorinated olefinic monomers are meant all the fluorinated products having at least one double bond C=C, optionally containing hydrogen and/or chlorine and/or bromine and/or iodine and/or oxygen, able to give rise to (co)polymers in the presence of radical initiators. Among them we can mention: C$_2$–C$_8$ perfluoroolefins, such as tetrafluoroethylene (TFE), hexafluoropropene (HFP), hexafluoroisobutene; C$_2$–C$_8$ hydrogenated fluoroolefins, such as vinyl fluoride (VF), vinylidene fluoride (VDF), trifluoroethylene, perfluoroalkylethylene CH$_2$=CH—R$_f$, wherein R$_f$ is a C$_1$–C$_6$ perfluoroalkyle; C$_2$–C$_8$ chloro- and/or bromo- and/or iodo-fluoroolefins, such as chlorotrifluoroethylene (CTFE) and bromotrifluoroethylene; (per)fluoroalkylvinylethers (PAVE) CF$_2$=CFOR$_f$, wherein R$_f$ is a C$_1$–C$_6$ (per)fluoroalkyle, for example trifluoromethyle, bromodifluoromethyle or pentafluoropropyle; (per)fluorooxy-alkyl-vinylethers CF$_2$=CFOX, wherein X is a C$_1$–C$_{12}$ (per) fluoro-oxyalkyl having one or more ether groups, for instance perfluoro-2-propoxy-propyle; perfluorodioxoles.

Such fluorinated olefinic monomers can also be copolymerized with C$_2$–C$_8$ non fluorinated olefins, such as ethylene, propylene, isobutylene.

The (elastomeric) segments of type B can in particular be selected from the following classes (compositions expressed as % by moles):

(1) copolymers based on VDF, which is copolymerized with at least one comonomer selected from: C$_2$–C$_8$ perfluoroolefins; C$_2$–C$_8$ chloro- and/or bromo- and/or iodo-fluoroolefins; (per)fluoroalkylvinylethers (PAVE) or (per)fluorooxyalkylvinylethers above defined; C$_2$–C$_8$ non fluorinated olefins (Ol); typical compositions are the following: (a$^1$) VDF 45–85%, HFP 15–45%, 0–30% TFE; (b$^1$) VDF 50–80%, PAVE 5–50%, TFE 0–20%; (c$^1$) VDF 20–30%, Ol 10–30%, HFP e/o PAVE 15–27%, TFE 10–30%;

(2) copolymers based on TFE, which is copolymerized with at least one comonomer selected from: (per)fluoroalkylvinylethers (PAVE) or (per)fluoro-oxyalkylvinylethers above defined; C$_2$–C$_8$ hydrogenated fluoroolefins; C$_2$–C$_8$ fluoroolefins containing chlorine and/or bromine and/or iodine atoms; C$_2$–C$_8$ non fluorinated olefins (Ol); typical compositions are the following: (a$^2$) TFE 50–80%, PAVE 20–50%; (b$^2$) TFE 45–65%, Ol 20–55%, 0–30% VDF; (c$^2$) TFE 32–60%, Ol 10–40%, PAVE 20–40%.

The (plastomeric) type A segments can in particular be selected from the following classes (compositions expressed as % by moles):

(1) polytetrafluoroethylene or modified polytetrafluoroethylene containing small amounts, generally in the range 0.1–3%, preferably lower than 0.5%, of one or more comonomers such as, for instance: HFP, PAVE, VDF, hexafluoroisobutene, CTFE, perfluoroalkylethylenes;

(2) TFE thermoplastic polymers containing from 0.5 to 8% of at least one PAVE, such as, for example, the copolymers between TFE and perfluoropropylvinylether and/or perfluoromethylvinylether, or also the TFE/perfluoroalkylethylene copolymers;

(3) TFE thermoplastic polymers containing from 2 to 20% of a C$_3$–C$_8$ perfluoroolefin, such as, for instance, FEP (TFE/HFP copolymer), to which other comonomers having a vinylethere structure CF$_2$=CF—OR$_f$ or CF$_2$=CF—OX as above defined, can be added in small amounts (lower than 5%);

(4) TFE or CTFE copolymers (40–60%) with ethylene, propylene or isobutylene (40–60%), optionally containing as third comonomer a C$_3$–C$_8$ (per)fluoroolefin or a PAVE, in amount in the range 0.1–10%;

(5) polyvinylidenfluoride or modified polyvinylidenfluoride containing small amounts, generally in the range 0.1–10%, of one or more fluorinated comonomers, such as hexafluoropropene, tetrafluoroethylene, trifluoroethylene.

The thermoplastic polymers of the above mentioned classes, and in particular the TFE-based polymers, can be modified with (per)fluorinated dioxoles, according for example to U.S. Pat. No. 3,865,845, U.S. Pat. No. 3,978,030, EP 73,087, EP 76,581, EP 80,187.

The preferred plastomeric segment of type A is formed by the VDF homopolymer (PVDF).

When the invention composition, as already said, is subjected to GAMMA or BETA ray irradiation, the final manufactured product, formed by a composition of the components (a), (b), optionally (c) and containing one or more crosslinking agents, can be subjected to an annealing treatment at a temperature lower of about 10–20° C. than the plastomer melting temperature for a time of about 1–6 hours. It has been found that this treatment further improves the mechanical and sealing properties.

The invention composition can preferably be obtained by mixing the latexes of the above mentioned components, obtained by emulsion or microemulsion polymerization, preferably microemulsion.

The composition can be obtained also by other methods, for example by a single polymerization process in which the two components (a) and (b) are separately obtained.

Optionally, to the compostion according to the invention, by using the latex mixing process, a plastomer in the form of latex of the same chemical nature of the plastomeric phase B of the components (a) and (b) can be added.

The following examples are given only for illustrative purposes and are not to be considered as limitative of the present invention.

EXAMPLE 1

Preparation of the Microemulsion

The microemulsion is prepared in the amount of 1 kg (equivalent to 782 ml), by adding the components indicated hereinunder in a glass reactor under mild stirring:

170 ml of acid with a number average molecular weight of 600 having the following formula:

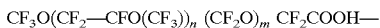
$CF_3O(CF_2-CFO(CF_3))_n \, (CF_2O)_m \, CF_2COOH-$ wherein n/m=10
170 ml of an aqueous solution of ammonium hydroxide at 30% by volume:
340 ml of demineralized water;
102 ml of Galden® D02.

EXAMPLE 2

Preparation of the Block Thermoplastic Elastomer Based on VDF, PFMVE, TFE Monomers Constituting the Component (a) of the of the invention composition.

In a 10 l vertical reactor, equipped with stirrer working at 540 rpm 6.5 l of water and 128 g from the microemulsion prepared acccording to Example 1 are introduced. The reactor is heated up to 80° C. and then brought to the pressure of 26 absolute bar by feeding in the reactor a gaseous mixture having the following monomer composition:

| | |
|---|---|
| VDF | 34% moles |
| PFMVE | 47% moles |
| TFE | 18% moles |

In the autoclave are then added:
a solution obtained by dissolving 6.8 ml of 1,6-diiodoperfluorohexane $C_6F_{12}I_2$ (chain transfer agent) in 13.5 ml of Galden D02.
1.3 ml of a solution obtained by dissolving 3.9 ml of bis-olefin of formula $CH_2=CH-(CF_2)_6-CH=CH_2$ in 22.1 ml of Galden D02.

The polymerization reaction is started by adding 208 ml of an aqeuous solution at a concentration of 1 g/l of ammonium persulphate (APS), maintaining the pressure constant during the polymerization at 26 absolute bar by feeding a gaseous mixture having the following monomer composition:

| | |
|---|---|
| VDF | 48% moles |
| PFMVE | 30% moles |
| TFE | 22% moles |

Amounts of 1.3 ml of the bis-olefin solution are fed to the reactor every 66 g fed of the above mentioned gaseous mixture. 20 additions are made in total, comprising the initial one.

After an amount of the of the monomer gaseous mixture equal to 1320 g (86 minutes of reaction) has been consumed, the reaction is stopped.

A latex formed by the fluorinated elastomer is obtained. The mooney viscosity (1+10 at 121° C.) of the elastomer isolated from the latex is 32.

The obtained latex is degassed until an amount of 0.3 bar of PFMVE and 0.03 bar of TFE is measured in the reactor top.

The polymerization of the plastomeric phase in the presence of the previous latex is then carried out. The reactor is brought to 80° C. with stirrer at 540 rpm. The pressure inside is brought to 31 absolute bar by feeding gaseous VDF and 100 ml of a 1 g/l APS solution are added. After the reaction has started, the pressure is maintained constant by continuously feeding VDF. After feeding an amount of VDF equal to 380 g (50 minutes of reaction) the polymerization is stopped. The autoclave is cooled and the latex is discharged. A small part is coagulated determining the percentage of dry residue. In the obtained thermoplastic elastomer the plastomeric phase/elastomeric phase ratio by weight is of 22/78. The MFI (determined at 230° C. with a 5 kg load) results lower than 0.1.

EXAMPLE 3

Preparation of the Block Thermoplastic Elastomer Based on VDF, PFMVE (perfluoromethylvinylether), TFE Monomers Constituting the Component (b) of the Invention Composition In a 10 l vertical reactor equipped with stirrer working at 540 rpm 6.5 l of water and 128 g from the microemulsion prepared according to Example 1 are introduced. The reactor is heated up to 85° C. and then brought to the pressure of 26 absolute bar by feeding in the reactor a gaseous mixture having the following monomer composition:

| | |
|---|---|
| VDF | 34% moles |
| PFMVE | 47% moles |
| TFE | 18% moles |

In the autoclave are then added:
a solution obtained by dissolving 12.8 ml of 1,6-diiodoperfluorohexane $C_6F_{12}I_2$ (chain transfer agent) in 25.6 ml of Galden D02.

The polymerization reaction is started by adding 208 ml of an aqeuous solution at a concentration of 1 g/l of ammonium persulphate (APS), maintaining the pressure constant during the polymerization at 26 absolute bar and feeding a gaseous mixture having the following monomer composition:

| | |
|---|---|
| VDF | 48% moles |
| PFMVE | 30% moles |
| TFE | 22% moles |

When an amount of the gaseous mixture of the monomers equal to 1500 g (38 minutes of reaction) has been consumed, the reaction is stopped.

A latex formed by the fluorinated elastomer is obtained. The mooney viscosity (1+10 at 121° C.) of the elastomer isolated from the latex is lower than 1.

The obtained latex is degassed until an amount of 0.3 bar of PFMVE and 0.03 bar of TFE is measured in the reactor top.

The polymerization of the plastomeric phase in the presence of the previous latex is then carried out. The reactor is brought to 80° C. with stirrer at 540 rpm. The pressure inside is brought to 31 absolute bar by feeding gaseous VDF and 100 ml of a 1 g/APS solution are added. After the reaction has started, the pressure is maintained constant by continuously feeding VDF. After feeding an amount of VDF equal to 74 g (23 minutes of reaction) the polymerization is stopped. The autoclave is cooled and the latex is discharged, coagulating a small part and determining the percentage of dry residue. In the obtained thermoplastic elastomer the plastomeric phase/elastomeric phase ratio is of 5/95 by weight. The MFI (determined at 230° C. with a 5 kg load) results higher than 100.

EXAMPLE 4

Preparation of the Block Thermoplastic Elastomer Based on VDF, HFP, TFE Monomers Constituting the Component (a) of the invention composition.

One proceeds as described in Example 2. The reactor is brought to the pressure of 26 absolute bar by feeding a gaseous mixture so that in the reactor top there is the following monomer composition:

| VDF | 28% moles |
|---|---|
| HFP | 57% moles |
| TFE | 15% moles | the pressure of 26 bar is maintained constant during the polymerization course by feeding a gaseous mixture having the following composition:

| VDF | 50% moles |
|---|---|
| HFP | 26% moles |
| TFE | 24% moles |

After 120 minutes of reaction, the amount of the obtained elastomeric polymer is equal to 1320 g and the reaction is stopped. The mooney viscosity (1+10 at 121° C.) of the obtained elastomer coagulating a small part of the polymerization latex is 40.

The polymerization of the plastomeric phase in the presence of the previous latex is carried out as described in the Example 2, except for the reaction temperature during the preparation that is of 70° C. and the polymerization time that is of 115 minutes, during which 380 g of VDF are fed.

In the obtained thermoplastic elastomer the plastomeric phase/elastomeric phase ratio is the same as the one of Example 2. The MFI (determined at 230° C. with a 5 kg load) results lower than 0.1.

EXAMPLE 5

Preparation of the Block Thermoplastic Elastomer Based on VDF, HFP, TFE Monomers Constituting the Component (b) of the invention composition.

One proceeds as described in Example 3, using HFP instead of PFMVE.

The reactor is brought to the pressure of 26 absolute bar by feeding in the reactor top a gaseous mixture having the following monomer composition:

| VDF | 28% moles |
|---|---|
| HFP | 57% moles |
| TFE | 15% moles | the pressure of 26 bar is maintained constant during the polymerization course by feeding a gaseous mixture having the following composition:

| VDF | 50% moles |
|---|---|
| HFP | 26% moles |
| TFE | 24% moles |

After 96 minutes of reaction, the amount of fed monomers is of 1500 g and the reaction is stopped.

The mooney viscosity (1+10 at 121° C.) of the elastomer obtained by coagulating a part of the polymerization latex is lower than 1.

The polymerization of the plastomeric phase in the presence of the previous latex is carried out as described in Example 3, except for the reaction temperature during the preparation of the PVDF phase that is of 70° C. and the polymerization time for preparing 74 g of PVDF that is equal to 39 minutes.

The autoclave is cooled and the latex is discharged, coagulating a small part and determining the percentage of dry residue. In the obtained thermoplastic elastomer the plastomeric phase/elastomeric phase ratio is of 5/95. The MFI (determined at 230° C. with a 5 kg load) results higher than 100.

EXAMPLE 6

Preparation of a Mixture Formed by 60 Parts of Component (a) of Example 2 and 40 Parts of Component (b) of Example 3.

In a glass container the latexes obtained in the preceding Examples 2 and 3 are mixed so as to obtain a composition [parts of component (a)]/[parts of component (b)] weight ratio equal to 60/40, based on the dry part.

The resulting latex is coagulated by addition of an aluminum sulphate solution (6 g of sulphate per liter of latex). After washing with demineralized water, the obtained polymeric mixture, appearing as an amorphous powder, is dried in stove for 24 hours at 70° C.

On the polymeric mixture the following determinations were carried out: monomeric composition by $^{19}F$ NMR, DSC, MFI, dynamic viscosity by rheogoniometer RMS 800. The results are reported in Table 1.

The polymer Gel Permeation Chromatography (GPC) carried out as previously described, shows a bimodal distribution of the molecular weights with two well distinct peaks.

3 phr of crosslinking agent triallylisocyanurate (TAIC) are added to the polymeric mixture. The powder is sent to a twin screw extruder and reduced in the form of granules. The granules are molded to obtain sheets (mm 100×100×2 sizes) and disks (mm 13 diameter and mm 6 thickness sizes) which are irradiated with GAMMA or BETA rays as previously described and successively subjected to annealing at 150° C. for 4 hours. The corresponding mechanical and sealing properties are then determined. The results are reported in Table 2. The compression set tests at high temperature are carried out according to ASTM D 395 Method B and VDA 675 216-B method.

EXAMPLE 7

Preparation of a Mixture Formed by 64 Parts of the Component (a) of Example 2, 26 Parts of the Component (b) of Example 3 and by 10 Parts of a Component (c)

The component (c) is the PVDF plastomer obtained by carrying out an emulsion polymerization of VDF as described in U.S. Pat. No. 5,473,030 or U.S. Pat. No. 5,583,190. The PVDF obtained by coagulating a small part of latex has a MFI value (230° C., 5 kg) equal to 52 and a second melting temperature equal to 168° C.

In a glass container the latex of component (c) is mixed with the latexes obtained in Examples 2 and 3, so as to obtain a composition [parts of component (a)]/[parts of component (b)]/[parts of component (c)] weight ratio equal to 64/26/10, based on the dry part.

The resulting latex is coagulated by addition of an aluminum sulphate solution (6 g of sulphate per liter of latex). After washing with distilled water, the obtained polymeric mixture is dried in stove for 24 hours at 70° C.

On the polymer the same determinations of the preceding Example 6 were carried out. The results are reported in Table 1.

The crosslinking agent (TAIC) is added to the powder and one proceeds then as described in the preceding Example 4. The results of the determinations carried out on the obtained product are shown in Table 2.

EXAMPLE 8

Preparation of a Mixture According to the Invention Composition Formed by 66 Parts of the Component (a) of Example 4 and 34 Parts of the Component (b) of Example 5

In a glass container the latexes obtained in the preceding Examples 4 and 5 are mixed, so as to obtain a composition [parts of component (a)]/[parts of component (b)] weight ratio equal to 66/34, based on the dry part.

The resulting latex is coagulated by addition of an aluminum sulphate solution (6 g of sulphate per liter of latex). After washing, the so obtained polymer is dried in stove for 24 hours at 70° C.

On the polymer the same determinations of the preceding Example 6 were carried out. The results are reported in Table 1.

The crosslinking agent (TAIC) is added to the powder and one proceeds then as described in the preceding Example 4. The results of the determinations carried out on the obtained product are shown in Table 2.

Example 9 (comparative)

Preparation of a Thermoplastic Elastomer Terpolymer VDF/PFMVE/TFE, Containing bis olefins, Which has not a Bimodal Distribution of the molecular weights.

The preparation of the thermoplatic elatomer is carried out as in Example 2 of this Patent Application, except for the following modifications introduced to adjust the processability according to the prior art:

the amount of the transfer agent 1,6-diiodoperfluorohexane introduced in autoclave is of 7.6 ml added with 15.1 ml of Galden D02® the amount of bis-olefin solution fed (see Example 2) is of 15 ml in total, added in 20 insertions with 0.75 ml the bis-olefin concentration in Galden D02® is the same of Example 2 the amount of VDF fed in the polymerization plastomeric phase is of 330 g.

The mooney viscosity of the elastomeric phase, obtained by coagulating a small part of the latex, is of 12.

The ratio plastomeric phase/elastomeric phase is of 20/80 by weight.

The results obtained on the product are reported in Table 1.

The polymer Gel Permeation Chromatography (GPC) carried out as above described shows a monomodal distribution of the molecular weights with only one well distinct peak.

Successively the compound is treated as described in Example 6 except that annealing is not carried out.

The mechanical and sealing properties of the sheets and of the disks, obtained with the crosslinked compound, are determined. The results are reported in Table 2.

TABLE 1

|  | Example 6 Mixture | Example 7 Mixture | Example 8 Mixture | Example 9 (comparative) |
|---|---|---|---|---|
| Composition (*) (% moles) |  |  |  |  |
| VDF | 63 | 68 | 65 | 66 |
| PFMVE | 20 | 17 |  | 18 |
| HFP |  |  | 15 |  |
| TFE | 17 | 15 | 20 | 16 |
| Plastomer/Elastomer Total ratio % by weight | 15/85 | 25/75 | 16/84 | 20/80 |
| Molecular weight distribution (GPC) | Bimodal | Bimodal | Bimodal | Monomodal |
| Tg (° C.) | −26 | −26 | −10 | −10 |
| Tm (° C.) | 161 | 163 | 164 | 162 |
| ΔHm (cal/g) | 2.3 | 3.1 | 2.5 | 2.7 |
| MFI (230° C., 5 Kg) | 2.6 | 1.4 | 1.4 | 0.2 |
| Dynamic viscosity, - RMS 800 (poise) | $<10^7$ | $<10^7$ | $<10^7$ | $>10^7$ |

(*) Monomeric composition excluding the bis-olefin (see the Examples)

TABLE 2

| | | | | |
|---|---|---|---|---|
| Mixture Ex. 6 (grams) | 100 | | | |
| Mixture Ex. 7 (grams) | | 100 | | |
| Mixture Ex. 8 (grams) | | | 100 | |
| Polymer Ex. 9 comp. (grams) | | | | 100 |
| TAIC (grams) | 3 | 3 | 3 | 3 |
| Mechanical Properties (ASTM D 412-83) sheets | | | | |
| Modulus at 100% (Mpa) | 1.6 | 2.5 | 1.9 | 2.0 |
| Stress at break (MPa) | 2.5 | 3.5 | 3.6 | 4.2 |
| Elongation at break (%) | 200 | 170 | 420 | 250 |
| Shore A Hardness (points) | 50 | 58 | 61 | 55 |
| radiation (2.5 Mrad) with GAMMA rays, (Co-60) and annealing at 150° C. for 4 h Mechanical Properties (ASTM D 412-83) sheets | YES | YES | YES | (**) |
| Modulus at 100% (Mpa) | 5.0 | 8.5 | 5.0 | 5.2 |
| Stress at break (Mpa) | 13.0 | 17.0 | 18.1 | 10.0 |
| Elongation at break (%) | 178 | 155 | 264 | 170 |
| Shore A Hardness (points) | 67 | 74 | 72 | 70 |
| Compression set disks | | | | |
| 150° C.*24 h (ASTM D 395 method B) | 29 | 32 | 27 | 47 |
| 150° C.*(22 + 2 h) (VDA 675 216-B) | 64 | 66 | 62 | 78 |

(**) In Example 9 radiation with gamma rays is carried out but not the successive annealing treatment

What is claimed is:

1. A composition containing fluorinated thermoplastic elastomers with different molecular weights and with different plastomeric phase/elastomeric phase ratios, said composition having a dynamic viscosity determined by rheogoniometer RMS® 800 (Frequency sweep, frequency of $10^{-2}$ radiants/sec, parallel plates) lower than $10^7$ poise and Melt Flow Index (MFI), determined according to the ASTM D 1238-52T standard with a 5 Kg load, greater than 1 (g/10 minutes), consisting essentially of:
  (a) 30–80% by weight of a fluorinated thermoplastic elastomer having a block structure A-B-A, wherein A is a plastomeric segment and B is an elastomeric segment, in which:
    at least one block is formed by a fluorinated elastomer and at least one block by a fluorinated plastomer;
    the elastomeric segment B having a Mooney viscosity greater than 10;
    the amount of plastomeric phase A is between 5 and 40% by weight;
    the MFI of the thermoplastic elastomer is less than 0.1;
  (b) 10–50% by weight of a fluorinated thermoplastic elastomer having a block structure of A-B-A, wherein A and B are as defined above, in which:
    there is at least a fluorinated elastomeric segment and at least a fluorinated plastomeric segment;
    the elastomer B has a Mooney viscosity less than 5;
    the plastomeric phase A is between 2 and 20% by weight;
    the MFI of the thermoplastic elastomer (b) is greater than 100;
  (c) 0–30% by weight of a fluorinated plastomer having an MFI value greater than 1.

2. The composition according to claim 1 wherein:
  the fluorinated thermoplastic elastomer of (a) having the block structure of A-B-A is present in amounts of 50–80% by weight, the plastomeric segment A is between 10–30% by weight and the elastomeric segment B has a Mooney viscosity greater than 30;
  the fluorinated thermoplastic elastomer of (b) having the block structure of A-B-A is present in amounts of 20–40% by weight, the elastomeric segment B has a Mooney less than 1, and the plastomeric segment A is between 3–10% by weight;
  the MFI of the thermoplastic polymer (b) is greater than 100; and
  0–15% by weight of a fluorinated plastomer contained in (a) and/or (b) has an MFI value greater than 50.

3. The composition according to claim 1, containing from 1 to 10 phr (parts per 100 parts) of a cross linking agent.

4. The composition according to claim 3, wherein the cross linking agent is selected from triallylisocyanurate (TAIC), 1,6 divinylperfluorohexane (bis-olefin) and N,N'bisallylbicyclo-oct-7-ene-disuccinimide(BOSA).

5. The composition according to claim 1, having a bimodal distribution of the molecular weights.

6. The composition according to claim 1, wherein the fluorinated thermoplastic elastomers forming the components (a) contain in the elastomeric segment B an amount by moles, based on the total amount of the other monomers of the elastomer or of the plastomer, from 0.1 to 1.0% of units derived from bis-olefins having the formula:

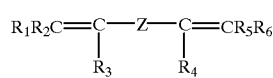
(IA)

wherein:
  $R_1$, $R_2$, $R_3$, $R_4$, $R_5$, $R_6$, equal to or different from each other, are H or alkyls $C_1$–$C_5$; Z is an alkylene or cycloalkylene radical $C_1$–$C_{18}$, linear or branched, optionally containing oxygen atoms, at least partially fluorinated, or a (per) fluoropolyoxyalkylene radical.

7. The composition according to claim 6 wherein, in the bis-olefin (IA), Z is a $C_4$–$C_{12}$ perfluoroalkylene radical, and $R_1$, $R_2$, $R_3$, $R_4$, $R_5$, $R_6$ are hydrogen, said (per) fluoropolyoxyalkylene radical having the formula:

$$-(Q)_p-CF_2O-(CF_2CF_2O)_m(CF_2O)_n-CF_2-(Q)_p- \quad \text{(II A)}$$

wherein: Q is an alkylene or oxyalkylene radical $C_1$–$C_{10}$; p is 0 or 1; m and n are numbers such that the m/n ratio is between 0.2 and 5 and the molecular weight of said (per)fluoropolyoxyalkylene radical is between 500–10,000.

8. The composition according to claim 1, wherein the fluorinated thermoplastic elastomers forming the component (b) contain in the elastomeric segment B an amount by moles from 0 to 1.0% of units derived from bis-olefins having the formula (IA).

9. The composition according to claim 1, wherein in the elastomeric segment B of the two components (a) and/or (b) there are monomeric units derived from at least an iodinated olefin having the formula:

$$CX_2=CX-R_f-CHR-I \quad \text{(I B)}$$

wherein:
  X is —H, —F, or —$CH_3$; R is —H or —$CH_3$; $R_f$ is a (per)fluoroalkylene radical, linear or branched, optionally containing one or more ether oxygen atoms, or a (per)fluoropolyoxyalkylene radical.

10. Compositions according to claim 9, wherein the iodinated olefin is selected from the following classes:

$$(1)\ CHR=CH-Z-CH_2CHR-I \quad \text{(II B)}$$

wherein: R is —H or —$CH_3$; Z is a (per)fluoroalkylene radical $C_1$–$C_{18}$, linear or branched, optionally containing one or more ether oxygen atoms, or a (per) fluoropolyoxyalkylene radical;

$$(2)\ CF_2=CF-O-(CF_2CFYO)_n-(CF_2CF_2CH_2O)_m-CF_2CF_2CH_2I \quad \text{(III B)}$$

wherein: Y is —F or —$CF_3$; m is an integer between 0 and 5; n is 0 1 or 2.

11. The composition according to claim 1, wherein the fluorinated elastomer and the fluorinated plastomer are obtained by (co)polymerizing fluorinated olefinic monomers having at least a double bond C=C, optionally containing hydrogen and/or chlorine and/or bromine and/or iodine and/or oxygen.

12. The composition according to claim 11, wherein the fluorinated olefinic monomers are selected from:
  perfluoroolefins $C_2$–$C_8$;
  hydrogenated fluoroolefins $C_2$–$C_8$;
  chloro- and/or bromo- and/or iodo-fluoroolefins $C_2$–$C_8$;
  (per)fluoroalkylvinylethers (PAVE) $CF_2=CFOR_f$, wherein $R_f$ is a (per)fluoroalkyl $C_1$–$C_6$;
  (per)fluoro-oxyalkylvinylethers $CF_2=CFOX$, wherein X is a (per)fluorooxyalkyl $C_1$–$C_{12}$ having one or more ether groups; and
  perfluorodioxoles.

13. The compositions according to claim 11, wherein the fluorinated olefinic monomers are copolymerized with non-fluorinated olefins.

14. The compositions according to claim 1, wherein the segments B (elastomeric) are selected from the following classes (compositions expressed as % by moles):

(1) copolymers based on vinylidine fluoride (VDF), copolymerized with at least a comonomer selected from: perfluoroolefins $C_2$–$C_8$; chloro- and/or bromo- and/or iodo-fluoroolefins $C_2$–$C_8$; (per)fluoroalkylvinylethers (PAVE) or (per)fluoro-oxyalkylvinylethers defined above; non-fluorinated olefins (Ol) $C_2$–$C_8$;

(2) copolymers based on tetrafluoroethylene (TFE) which is copolymerized with at least a comonomer selected from (per)fluoroalkylvinylethers (PAVE) or (per)fluoro-oxyalkylvinylethers as defined in claim 12; hydrogenated fluoroolefins $C_2$–$C_8$; fluoroolefins $C_2$–$C_8$ containing chlorine and or bromine and/or iodine atoms; and non-fluorinated olefins (Ol ) $C_2$–$C_8$.

15. The composition according to claim 14, wherein the segments A (plastomeric) are selected from the following classes (compositions expressed as % by moles):

(1) ($a^1$) VDF 45–85%, hexafluoropropene (HFP) 15–45%, TFE 0–30%; ($b^1$) VDF 50–80%, PAVE 5–50%, TFE 0–20%; ($c^1$) VDF 20–30%, Ol 10–30%, hexafluoropropene (HFP) e/o PAVE-15–27%, TFE 10–30%; and (2) ($a^2$) TFE 50–80%, PAVE 20–50%; ($b^2$) TFE 45–65%, Ol 20–55%, VDF 0–30%; ($c^2$) TFE 32–60%, Ol 20–40%, PAVE 20–40%.

16. The composition according to claim 1, wherein the segments A (plastomeric) are selected from the following classes (compositions expressed as % by moles):

(1) polytetrafluoroethylene or modified polytetrafluoroethylene containing between 0.1 and 3% of one or more comonomers selected from: hexafluoropropene (HFP), (per)fluoroalkylvinylethers (PAVE), vinylidine fluoride (VDF), hexafluoroisobutene, chlorotrifluoroethylene (CTFE), perfluoroalkylethylenes;

(2) tetrafluoroethylene (TFE) thermoplastic polymers containing from 0.5 to 8% of perfluoropropylvinylether and/or perfluoromethylvinylether, or TFE/perfluoroalkylethylene copolymers;

(3) TFE thermoplastic polymers containing from 2 to 20% of a perfluoroolefin $C_3$–$C_8$ to which other comonomers having a vinylether structure $CF_2$=CF—$OR_f$ or $CF_2$=CF—OX defined as in claim 12, are added in amounts less than 5%;

(4) TFE of CTFE copolymers (40–60%) with ethylene, propylene or isobutylene (40–60%), optionally containing as a third comonomer a perfluoroolefin $C_3$–$C_8$ or a PAVE, in amounts between 0.1–10%;

(5) polyvinylidenfluoride or modified polyvinylidenfluoride containing between 0.1 and 10% of one or more fluorinated comonomers selected from hexafluoropropene, tetrafluoroethylene, and trifluoroethylene.

17. The compositions according to claim 16, wherein the TFE thermoplastic polymers are modified with (per) fluorinated dioxoles.

18. An article manufactured with the composition of claim 1 and produced by extrusion or molding.

19. The article of claim 18 subjected to GAMMA irradiation in amounts between 1 and 30 Mrad, or BETA irradiation in amounts between 10 and 3000 KGY (Kilogrey).

20. The article according to claim 19, wherein after irradiation the article is subjected to an annealing treatment at a temperature less than about 10–20° C. than the melting temperature of the plastomer for a time of about 1–6 hours.

21. The article according to claim 18, wherein after irradiation the article is subjected to an annealing treatment at a temperature less than about 10–20° C. than the melting temperature of the plastomer for a time of about 1–6 hours.

* * * * *